United States Patent
Lee (10) Patent No.: US 10,422,982 B2
(45) Date of Patent: Sep. 24, 2019

(54) SUPER-WIDE ANGLE LENS AND PHOTOGRAPHING LENS HAVING THE SAME

(71) Applicant: Samsung Electronics Co., Ltd., Suwon-si, Gyeonggi-do (KR)

(72) Inventor: Yong-jae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/060,002

(22) Filed: Mar. 3, 2016

(65) Prior Publication Data

US 2016/0274339 A1    Sep. 22, 2016

(30) Foreign Application Priority Data

Mar. 18, 2015    (KR) .................. 10-2015-0037700

(51) Int. Cl.
*G02B 3/02*     (2006.01)
*G02B 13/18*    (2006.01)
*G02B 13/06*    (2006.01)

(52) U.S. Cl.
CPC .................... *G02B 13/06* (2013.01)

(58) Field of Classification Search
CPC ............. G02B 13/0045; G02B 13/009; G02B 27/0025; G02B 27/0075; G02B 9/64; G02B 15/20; G02B 15/14; G02B 15/163; G02B 17/0896
USPC ................................................. 359/642–830
See application file for complete search history.

(56) References Cited

U.S. PATENT DOCUMENTS

| | | | |
|---|---|---|---|
| 5,724,193 A * | 3/1998 | Hirakawa ............ | G02B 15/177 359/691 |
| 7,595,938 B2 | 9/2009 | Yamakawa et al. | |
| 7,933,078 B2 | 4/2011 | Jung et al. | |
| 8,248,715 B2 | 8/2012 | Asami et al. | |
| 9,766,433 B2 * | 9/2017 | Chen .................. | G02B 13/0045 |
| 2011/0102541 A1 * | 5/2011 | Jin ......................... | G02B 9/60 348/36 |
| 2012/0206822 A1 * | 8/2012 | Hsieh ..................... | G02B 9/62 359/753 |
| 2012/0268835 A1 * | 10/2012 | Huang ............... | G02B 13/0045 359/717 |
| 2014/0063626 A1 * | 3/2014 | Huang ................... | G02B 13/06 359/752 |
| 2015/0260963 A1 * | 9/2015 | Yamakawa ........ | G02B 13/0045 359/714 |

(Continued)

FOREIGN PATENT DOCUMENTS

| | | |
|---|---|---|
| JP | 2010-160479 A | 7/2010 |
| JP | 4947700 B2 | 6/2012 |
| JP | 2013-73143 A | 4/2013 |

(Continued)

*Primary Examiner* — Mahidere S Sahle
(74) *Attorney, Agent, or Firm* — Jefferson IP Law, LLP (57) ABSTRACT

A super-wide angle lens and a photographing apparatus including the super-wide angle lens are provided. The super-wide angle lens includes a first lens having a negative refractive power and a second lens having a positive refractive power, wherein the first lens and the second lens are disposed in sequential order from an object side to an image side, and wherein the super-wide angle lens has a half view angle of 80 degrees or greater.

19 Claims, 5 Drawing Sheets

(56) References Cited

U.S. PATENT DOCUMENTS

2015/0331224 A1* 11/2015 Shih ..................... G02B 9/62
359/756

FOREIGN PATENT DOCUMENTS

| JP | 2013-73152 A | 4/2013 |
|---|---|---|
| KR | 10-1390089 B1 | 4/2014 |
| KR | 10-1417763 B1 | 7/2014 |

* cited by examiner

SUPER-WIDE ANGLE LENS AND PHOTOGRAPHING LENS HAVING THE SAME

CROSS-REFERENCE TO RELATED APPLICATION(S)

This application claims the benefit under 35 U.S.C. § 119(a) of a Korean patent application filed on Mar. 18, 2015 in the Korean Intellectual Property Office and assigned Serial number 10-2015-0037700, the entire disclosure of which is hereby incorporated by reference.

TECHNICAL FIELD

The present disclosure relates to super-wide angle lenses and photographing apparatuses including the super-wide angle lenses.

BACKGROUND

Many photographing apparatuses use solid-state photographing devices such as charge-coupled device (CCD) image sensors or complementary metal-oxide semiconductor (CMOS) image sensors. Examples of such photographing apparatuses include digital cameras, video cameras, and interchangeable lens cameras. Users of the photographing apparatuses demand a high resolution and a high quality. Since photographing apparatuses employing solid-state imaging devices are manufactured to have small sizes, recent terminals such as cellular phones are equipped with such photographing apparatuses.

As the supply of cameras is increased, demand for single focus lenses such as a telephoto lens or a wide angle lens is also increasing. Also, a super-wide angle lens having a large angle of view of about 180° is widely used by users of high-end cameras to obtain artistically expressive images.

A super-wide angle lens needs to have a high resolution that is suitable for high-pixel digital cameras and also a compact size to be carried easily.

In addition, users of digital cameras demand fast autofocusing and also prioritize a video function.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide compact super-wide angle lenses.

Another aspect of the present disclosure is to provide photographing apparatuses including the compact super-wide angle lenses.

In accordance with an aspect of the present disclosure, a super-wide angle lens is provided. The super-wide angle lens includes a first lens having a negative refractive power and a second lens having a positive refractive power, wherein the first lens and the second lens are disposed in sequential order from an object side to an image side, wherein a half view angle of the super-wide angle lens is 80 degrees or greater and the super-wide angle lens satisfies $8<\omega/TL<18$, and wherein $\omega$ denotes a half view angle and TL denotes a distance from an object side surface of the first lens to an image plane.

The super-wide angle lens may satisfy $0.15>f/f12>-0.15$, wherein f12 denotes a combined focal length of the first lens and the second lens and f denotes an entire focal length of the super-wide angle lens.

The super-wide angle lens may satisfy $-0.75>(R2+R1)/(R2-R1)>-1.50$, wherein R1 denotes a radius of curvature of the object side surface of the first lens and R2 denotes a radius of curvature of an image side surface of the first lens.

The super-wide angle lens may satisfy $-0.25<fB/TL<0.25$, wherein fB denotes a distance from an image side surface of a lens that is a closest lens to the image side to the image plane and TL denotes a distance from the object side surface of the first lens to the image plane.

When the super-wide angle lens is used in a focusing operation, all lenses included in the super-wide angle lens may be moved to perform the focusing operation or at least some of the lenses except the first lens may be moved to perform the focusing operation.

The first lens may be comprise glass.

The super-wide angle lens may satisfy $1<(TL/Y)<4$, wherein TL denotes a distance from the object side surface of the first lens to the image plane and Y denotes an effective image height.

The super-wide angle lens may further include an aperture stop at an image side of the second lens.

In accordance with another aspect of the present disclosure, a super-wide angle lens is provided. The super-wide angle lens includes a first lens having a negative refractive power, a second lens having a positive refractive power, a third lens having a positive refractive power, a fourth lens having a positive refractive power, a fifth lens having a negative refractive power, and a sixth lens having a positive or negative refractive power, wherein the super-wide angle lens has a half view angle of 80 degrees or greater, and wherein the lenses are disposed in a sequential order from an object side to an image side.

The super-wide angle lens may further include an aperture stop between the second lens and the third lens.

The sixth lens may have at least one inflection point on at least one of an object side surface and an image side surface.

An object side surface of the third lens may have a convex meniscus shape facing an image side.

In accordance with another aspect of the present disclosure, a photographing apparatus is provided. The photographing apparatus includes a super-wide angle lens, and an image sensor configured to receive an image formed by using the super-wide angle lens, wherein the super-wide angle lens includes a first lens having a negative refractive power and a second lens having a positive refractive power, wherein the first lens and the second lens are disposed in sequential order from an object side to an image side, wherein a half view angle of the super-wide angle lens is 80 degree or greater and the super-wide angle lens satisfies $8<\omega/TL<18$, wherein $\omega$ denotes a half view angle and TL denotes a distance from an object side surface of the first lens to the image plane.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Super-wide angle lenses and photographing apparatuses including the super-wide angle lenses will now be described according to various embodiments of the present disclosure with reference to the accompanying drawings.

Figure 1:
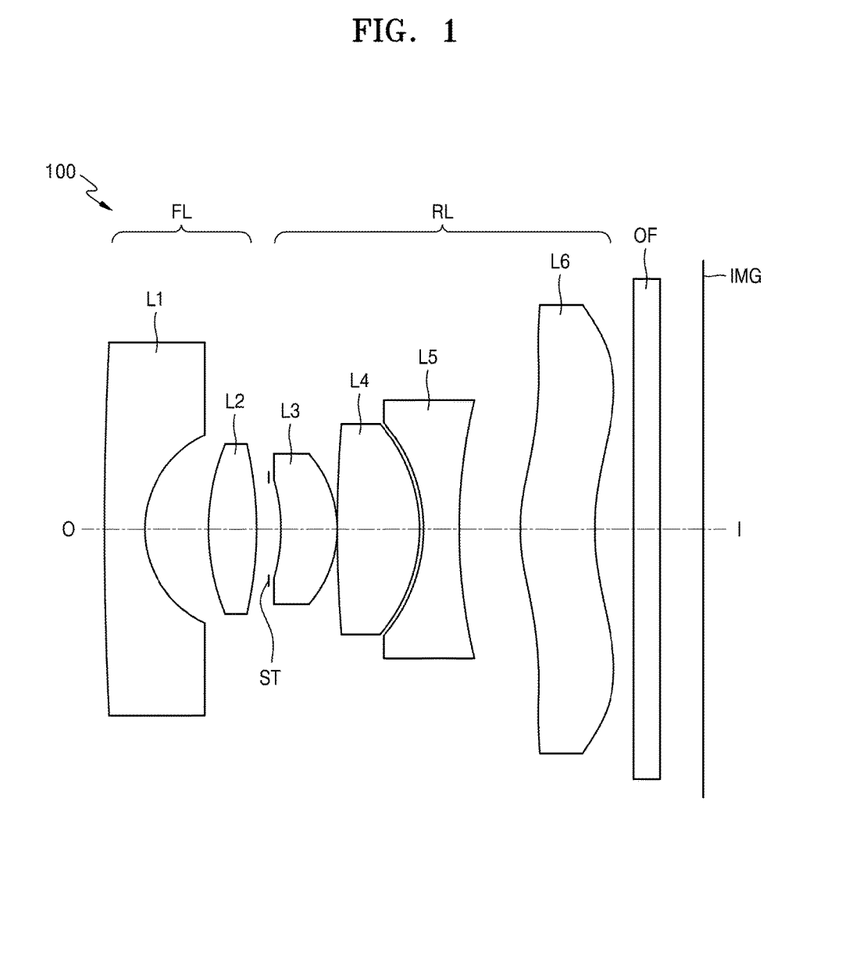
FIG. 1 illustrates a super-wide angle lens according to an embodiment of the present disclosure.

FIG. 1 illustrates a super-wide angle lens according to an embodiment of the present disclosure.

Referring to FIG. 1 a super-wide angle lens 100 according to a first embodiment of the present disclosure may include a first lens L1 and a second lens L2 sequentially arranged in a direction from an object side O to an image side I. The first lens L1 may have, for example, a negative refractive power, and the second lens L2 may have a positive refractive power.

The super-wide angle lens 100 may include a front lens group FL, an aperture stop ST, and a rear lens group RL. The front lens group FL and the rear lens group RL may be distinguished from each other with respect to the aperture stop ST, and if no aperture stop is included, the front lens group FL and the rear lens group RL may be distinguished from each other with respect to a fixed aperture surface via which rays are controlled.

Hereinafter, an image side may refer to a side facing an image plane on which an image is formed, and an object side may refer to a side facing a subject. Hereinafter, an object side surface of a lens may refer to a lens surface facing the subject, and an image side surface of a lens may refer to a lens surface facing an image plane.

The front lens group FL may include, for example, the first lens L1 and the second lens L2.

The first lens L1 may have, for example, a concave image side surface facing the image side I. The second lens L2 may have, for example, a convex object side surface facing the object side O. The second lens L2 may be, for example, a biconvex lens.

The rear lens group RL may include, for example, a third lens L3 having a positive refractive power, a fourth lens L4 having a positive refractive power, a fifth lens L5 having a negative refractive power, and a sixth lens L6 having a positive or negative refractive power.

By arranging refractive powers of the front lens group FL and the rear lens group RL as above, a Petzval sum may be easily obtained or chromatic aberration may be easily controlled.

The third lens L3 may have, for example, a convex meniscus shape toward the image side I. As the third lens L3 has a meniscus shape, astigmatic field curve may be effectively corrected.

The fourth lens L4 may have, for example, a convex image side surface facing the image side I. The fourth lens L4 may be, for example, a biconvex lens. The fifth lens L5 may have, for example, a concave image side surface facing the image side I. The fifth lens L5 may be, for example, a biconcave lens.

An image of a subject may pass through the first lens L1, the second lens L2, the third lens L3, the fourth lens L4, the fifth lens L5, and the sixth lens L6 to be incident on the image plane IMG. The image plane IMG may be, for example, a surface of an image capturing device or a surface of an image sensor. The image sensor may include, for example, a complementary metal oxide semiconductor (CMOS) or a charge-coupled device (CCD).

At least one optical filter OF may be disposed between the sixth lens L6 and the image plane IMG. The optical filter OF may include at least one of a low-pass filter, an infrared (IR)-cut filter, and a cover glass. If the optical filter OF includes an IR-cut filter, visible light may pass through the optical filter OF but infrared light may be reflected back to the outside so that the infrared rays do not reach the image plane IMG. However, photographing lenses may not include an optical filter OF.

The front lens group FL and the rear lens group RL may each include at least one aspherical lens. For example, the second lens L2 may be an aspherical lens. For example, the sixth lens L6 of the rear lens group RL, which is the closest lens to the image side I, may be an aspherical lens. The first lens L1 may be formed of glass, whereas the second through sixth lenses L2, L3, L4, L5, and L6 may be formed of plastic.

The super-wide angle lens 100 may have a wide angle view, for example, a half angle view of 80 degrees or greater. The super-wide angle lens 100 may have a half angle view in a range of, for example, 80 to 120 degrees. The super-wide angle lens 100 may perform focusing. For example, all lenses included in the super-wide angle lens 100 may be moved to perform focusing, or at least one some of the lenses except the first lens L1 may be moved to perform focusing. For example, the second through sixth lenses L2 through L6 may be moved to perform focusing or lenses included in the rear lens group RL may be moved to perform focusing. According to the embodiment of the present disclosure illustrated in FIG. 1, all lenses are moved to perform focusing. As will be described below with reference to FIG. 3, lenses of the rear lens group RL may also be moved to perform focusing.

According to the super-wide angle lens 100 according to the embodiment of the present disclosure, the total number of lenses of the super-wide angle lens is minimized to provide a compact size, and a radius of curvature of the object side surface of the first lens L1 may be increased. As the radius of curvature of the object side surface of the first lens L1 is reduced, an inclination of the first lens L1 is sharper so that the first lens L1 has a convex shape. Accordingly, a front surface of the first lens L1 is protruded and it may be difficult to carry a camera including the super-wide angle lens and to protect the first lens L1. Thus, the radius of curvature of the object side surface of the first lens L1 may be increased so that the object side surface of the first lens L1 is almost planar.

At least one aspherical lens may be disposed in each of the front lens group FL and the rear lens group RL to correct aberration. For example, a lens of the rear lens group RL, which is the closest lens to the image side I, may be an aspherical lens. For example, the sixth lens L6 may be an aspherical lens, and at least one of an object side surface and an image side surface of the sixth lens L6 may have at least one inflection point. Herein, the term "inflection point" may refer to a point at which a sign of the radius of curvature of a lens surface changes from positive (+) to negative (−), or from negative (−) to positive (+). In addition, the term "reflection point" may refer to a point at which the shape of a lens surface changes from convex to concave, or from concave to convex. The sixth lens L6 may have, for example, a convex meniscus shape toward the object side around an optical axis within a predetermined radius from the optical axis. The sixth lens L6 may have, around the optical axis, a convex object side surface toward the object side O and a concave image side surface toward the image side I. The object side surface of the sixth lens L6 may have a convex shape around the optical axis, and have a concave shape away from the optical axis. The image side surface of the sixth lens L6 may have a concave shape around the optical axis, and have a convex shape away from the optical axis.

The super-wide angle lens 100 according to the embodiment of the present disclosure may satisfy the following condition.

$$8 < \omega/TL < 18 \quad \text{Equation 1}$$

Here, ω denotes a half view angle, and TL denotes a distance from the object side surface of the first lens L1 to the image plane IMG.

If (ω/TL) is less than a lower limit of Equation 1, the super-wide angle lens 100 may not have a compact size, and if (ω/TL) is greater than an upper limit of Equation 1, the super-wide angle 100 may be too small with respect to a view angle and thus, it is difficult to provide improved optical performance.

The super-wide angle lens 100 according to an embodiment of the present disclosure may satisfy the following condition.

$$0.15 > f/f12 > -0.15 \quad \text{Equation 2}$$

Here, f12 denotes a combined focal length of the first lens L1 and the second lens L2, and f denotes an entire focal length of the super-wide angle lens 100.

When (f/f12) satisfies Equation 2, refractive powers of the first lens and the second lens may be appropriately distributed so that aberration is easily corrected. That is, when (f/f12) satisfies Equation 2, the refractive powers are suitable so that aberration may be easily controlled, but if (f/f12) does not satisfy Equation 2, it may be difficult to control aberration.

The super-wide angle lens according to an embodiment of the present disclosure may satisfy the following condition.

$$-0.75 > (R2+R1)/(R2-R1) > -1.50 \quad \text{Equation 3}$$

Here, R1 denotes a radius of curvature of the object side surface of the first lens, and R2 denotes a radius of curvature of the image side surface of the first lens.

When Equation 3 is satisfied, the radius of curvature of the object side surface of the first lens may be relatively great so that the object side surface of the first lens is an almost planar surface rather than protruding to the front. Thus, the super-wide angle lens satisfying Equation 3 may have increased portability. The shape of a lens is directly linked to aberration and performance, and is an important factor in regard to providing improved performance.

The first lens may be formed of glass. When the first lens is formed using glass, which has higher rigidity than a resin material, the first lens is less vulnerable to external impact and no additional protection glass may be needed to protect the super-wide angle lens. Thus, because a protection glass is omitted, a photographing apparatus including the super-wide angle lens may have an even more compact size, and may be suitable to be applied to photographing apparatuses for mobile devices.

The super-wide angle lens according to an embodiment of the present disclosure may satisfy the following condition.

$$-0.25 < fB/TL < 0.25 \quad \text{Equation 4}$$

Here, fB denotes a distance from an image side surface of a lens, which is the closest lens to the image side, to the image plane, and TL denotes a distance from the object side surface of the first lens to the image plane.

When (fB/TL) satisfies Equation 4, a size of the super-wide angle lens may be reduced, and an incidence angle of light rays on the image plane may be easily controlled. Thus, it may be easy to correct aberration. When (fB/TL) is less than the lower limit of Equation 4, an angle at which light rays are incident on the image plane is likely to increase. Thus, subsequent correction or the like may be additionally required for captured images. If (fB/TL) is outside a range of Equation 4, an incident angle of light rays on the image plane may be increased or it may be difficult to control aberration.

The super-wide angle lens according to an embodiment of the present disclosure may satisfy the following condition.

$$1 < (TL/Y) < 4 \quad \text{Equation 5}$$

Here, TL denotes a distance from the object side surface of the first lens to the image plane, and Y denotes an effective image height.

Equation 5 defines a relationship between a size of the super-wide angle lens and an image height. When (TL/Y) satisfies a range of Equation 5, a total size of the super-wide angle lens with respect to the image height may be limited so as to maintain a compact size of the super-wide angle lens and implement a desired image height, and the super-wide angle lens 100 may have excellent optical performance.

In regard to the super-wide angle lens (or fisheye lens), an effective image height and distortion may be differently defined from those of a typical lens system.

A typical image height y and typical distortion in typical image height y (DIY) are defined as expressed by the following conditions.

$$y = f \tan\theta \qquad \text{Equation 6}$$

Here, θ denotes an angle of view, and f denotes an effective focal length.

$$DIY = \frac{Y_P - y_P}{y_P} \times 100(\%) = \frac{Y_P - f \cdot \tan\theta}{f \cdot \tan\theta} \times 100(\%) \qquad \text{Equation 7}$$

Here, $Y_p$ denotes a real image height, and $y_p$ denotes a paraxial image height.

On the other hand, a mapping function of the super-wide angle lens (or fisheye lens) is as follows.

TABLE 1

|  | Mapping function |
|---|---|
| Normal | $y = 2f \cdot \sin\frac{\theta}{2}$ |
| Linear Scaled (Equidistance) | $y = f \cdot \tan\theta$ |
| Orthographic | $y = f \cdot \theta$ |
| Equal Area (EquiSolid Angle) | $y = f \cdot \sin\theta$ |
| Stereographic | $y = 2f \cdot \tan\frac{\theta}{2}$ |

An effective image height is based on, unless described otherwise, the mapping function of the fisheye lens above, and may be based mainly on an equisolid angle method or an equidistance method.

Meanwhile, an aspherical surface used in the super-wide angle lens according to the various embodiments of the present disclosure is defined as below.

When an optical axis is set as an x-axis, a direction perpendicular to the optical axis is set as a y-axis, and the propagation direction of light rays is denoted as a positive direction, an aspheric surface of a lens may be defined by a condition below. In Equation 8, x denotes a distance measured from the vertex of a lens in the direction of the optical axis of the lens, y denotes a distance measured from the optical axis in a direction perpendicular to the optical axis, K denotes a conic constant, A, B, C, D, . . . denote aspheric coefficients, and c denotes the reciprocal (1/R) of the radius of curvature at the vertex of the lens.

$$x = \frac{cy^2}{1 + \sqrt{1 - (K+1)c^2 y^2}} + Ay^4 + By^6 + Cy^8 + Dy^{10} + \ldots \qquad \text{Equation 8}$$

Various embodiments of the present disclosure may provide variously designed photographing lens systems as described below.

In the following various embodiments of the present disclosure, lens surfaces are sequentially numbered with 1, 2, 3 . . . n (n is a natural number) in an order from an object side O to an image side I, and lens surface numbers are not illustrated in the drawings. Also, obj denotes an object, effective focal length (EFL) denotes a focal length of each lens, F-no denotes an F-number, field of view (FOV) denotes an angle of view, R denotes a radius of curvature, Dn denotes a lens thickness or air space between lenses, nd denotes a refractive index, and vd denotes an Abbe number. St denotes an aperture and * denotes an aspherical surface.

First Embodiment of the Present Disclosure

Table 2 below shows design data of the first embodiment of the present disclosure.

TABLE 2

| Lens surface | R | Dn | EFL(e-line) | nd | vd |
|---|---|---|---|---|---|
| Obj | infinity | D0 | | | |
| 1 | 50.00 | 0.45 | −2.40 | 1.49 | 70.44 |
| 2 | 1.14 | 0.71 | | | |
| 3* | 2.28 | 0.54 | 3.12 | 1.53 | 56.51 |
| 4* | −5.67 | 0.15 | | | |
| 5(ST) | infinity | 0.12 | | | |
| 6* | −2.69 | 0.64 | 4.28 | 1.53 | 56.51 |
| 7* | −1.34 | 0.01 | | | |
| 8 | 21.02 | 0.92 | 2.19 | 1.77 | 49.62 |
| 9 | −1.81 | 0.05 | | | |
| 10* | −1.73 | 0.40 | −2.17 | 1.64 | 23.90 |
| 11* | 7.86 | 0.69 | | | |
| 12* | 2.38 | 0.84 | 18.16 | 1.53 | 56.51 |
| 13* | 2.76 | 0.44 | | | |
| 14 | infinity | 0.30 | | 1.52 | 64.20 |
| 15 | infinity | D1 | | | |
| IMG | infinity | | | | |

Table 3 below shows aspherical coefficients of the first embodiment of the present disclosure.

TABLE 3

| Lens surface | K | A | B | C | D |
|---|---|---|---|---|---|
| 3 | 0.88 | −0.01 | −0.03 | 0.09 | −0.11 |
| 4 | −3.69 | 0.01 | −0.03 | −0.10 | 0.06 |
| 6 | 13.10 | 0.01 | −0.08 | 0.19 | 0.00 |
| 7 | −3.78 | −0.18 | 0.06 | −0.09 | 0.00 |
| 10 | −0.28 | 0.06 | −0.05 | 0.00 | 0.00 |
| 11 | −0.63 | 0.02 | −0.01 | 0.00 | 0.00 |
| 12 | −4.53 | −0.05 | 0.01 | 0.00 | 0.00 |
| 13 | −1.20 | −0.05 | 0.00 | 0.00 | 0.00 |

Table 4 below shows a variable distance, F-no, and TL of the first embodiment of the present disclosure.

TABLE 4

| Division | first position | second position |
|---|---|---|
| D0 | infinity | 300 |
| D1 | 0.50 | 0.52 |
| F-no | 2.86 | 2.87 |
| TL | 6.75 | 6.766 |

Figure 2:
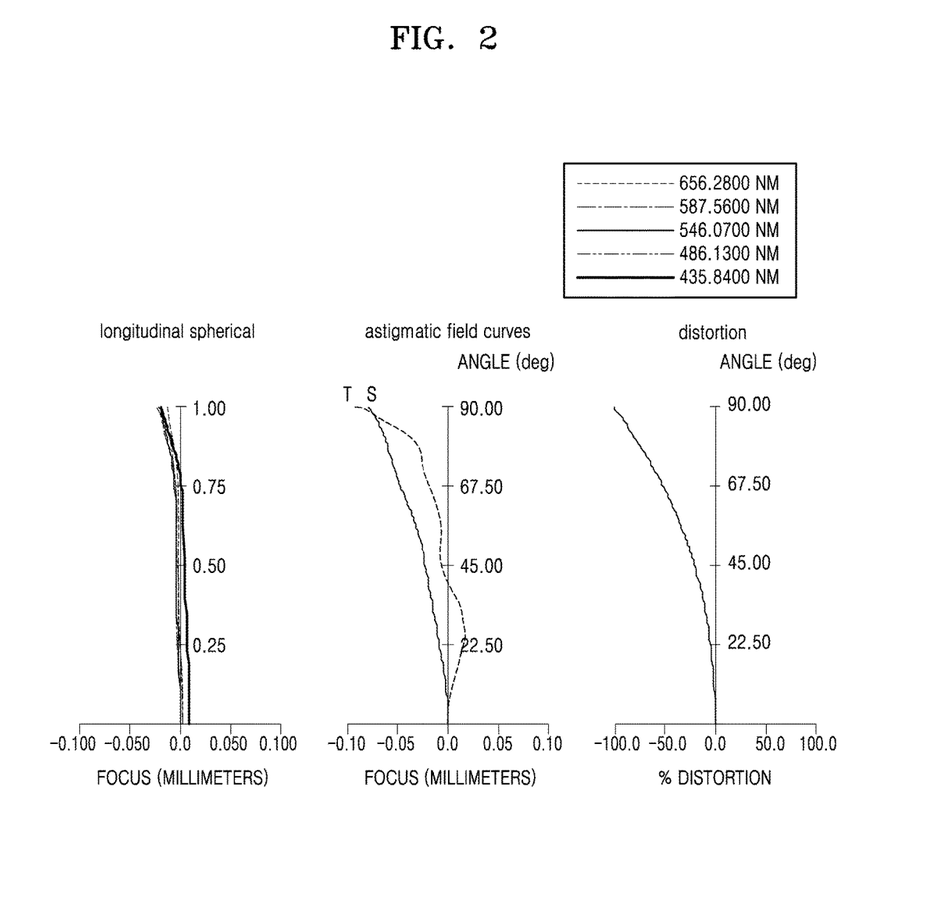
FIG. 2 illustrates aberration diagrams of the super-wide angle lens illustrated in FIG. 1 according to an embodiment of the present disclosure.

FIG. 2 illustrates aberration diagrams of the super-wide angle lens illustrated in FIG. 1 according to embodiment of the present disclosure.

Referring to FIG. 2, a longitudinal spherical aberration diagram, astigmatic field curves, and a distortion graph are illustrated. The astigmatic field curves include a tangential field curvature T and a sagittal field curvature S.

Second Embodiment of the Present Disclosure

Figure 3:
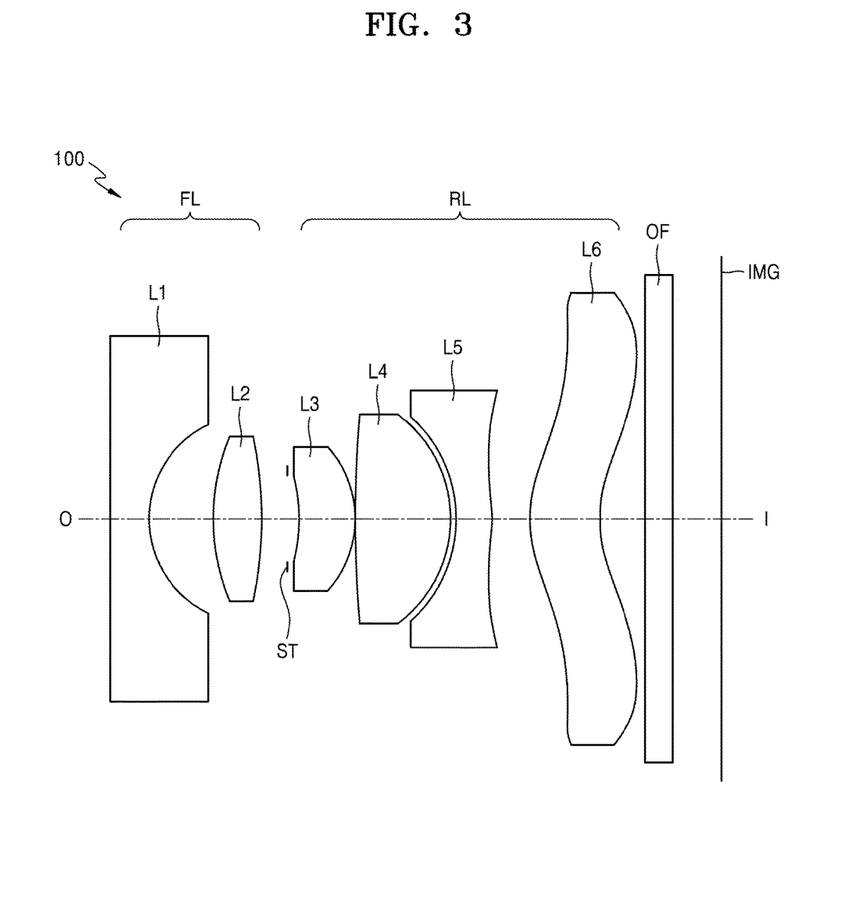
FIG. 3 illustrates a super-wide angle lens according to an embodiment of the present disclosure.

FIG. 3 illustrates a super-wide angle lens according to an embodiment of the present disclosure.

Referring to FIG. 3, a super-wide angle lens 100 according to a second embodiment of the present disclosure is illustrated. Table 5 below shows design data of the second embodiment of the present disclosure.

TABLE 5

| Lens surface | R | Dn | EFL(e-line) | nd | vd |
|---|---|---|---|---|---|
| Obj | infinity | D0 | | | |
| 1 | 2275.64 | 0.45 | −2.50 | 1.49 | 70.44 |
| 2 | 1.22 | 0.72 | | | |
| 3* | 3.03 | 0.53 | 3.70 | 1.54 | 56.09 |
| 4* | −5.72 | D1 | | | |
| 5(stp) | infinity | 0.12 | | | |
| 6* | −3.04 | 0.64 | 4.75 | 1.53 | 56.51 |
| 7* | −1.48 | 0.01 | | | |
| 8* | 5.26 | 1.09 | 2.21 | 1.53 | 56.51 |
| 9* | −1.41 | 0.05 | | | |
| 10* | −1.04 | 0.40 | −2.38 | 1.64 | 23.90 |
| 11* | −3.74 | 0.44 | | | |
| 12* | 1.49 | 0.80 | 10.93 | 1.54 | 56.09 |
| 13* | 1.61 | 0.51 | | | |
| 14 | infinity | 0.30 | | 1.52 | 64.20 |
| 15 | infinity | D2 | | | |
| IMG | infinity | 0 | | | |

Table 6 below shows aspherical coefficients of the second embodiment of the present disclosure.

TABLE 6

| Lens surface | K | A | B | C | D |
|---|---|---|---|---|---|
| 3 | −25.40 | 0.14 | −0.11 | 0.14 | −0.07 |
| 4 | 27.86 | 0.06 | 0.01 | −0.06 | 0.03 |
| 6 | 20.06 | 0.02 | −0.05 | 0.22 | 0.00 |
| 7 | 0.92 | 0.00 | −0.01 | −0.05 | 0.00 |
| 8 | 16.31 | −0.03 | −0.03 | 0.00 | −0.01 |
| 9 | −0.22 | 0.01 | −0.01 | 0.00 | 0.00 |
| 10 | −3.64 | 0.03 | −0.06 | 0.02 | 0.00 |
| 11 | −39.52 | 0.10 | −0.04 | 0.01 | 0.00 |
| 12 | −4.35 | −0.03 | 0.00 | 0.00 | 0.00 |
| 13 | −3.85 | −0.02 | 0.00 | 0.00 | 0.00 |

Table 7 below shows a variable distance, F-no, and TL of the second embodiment of the present disclosure.

TABLE 7

| Division | First position | Second position |
|---|---|---|
| D0 | infinity | 70 mm |
| D1 | 0.30 | 0.26 |
| D2 | 0.55 | 0.59 |
| F-no | 2.86 | 2.91 |
| TL | 6.90 | 6.90 |

Figure 4:
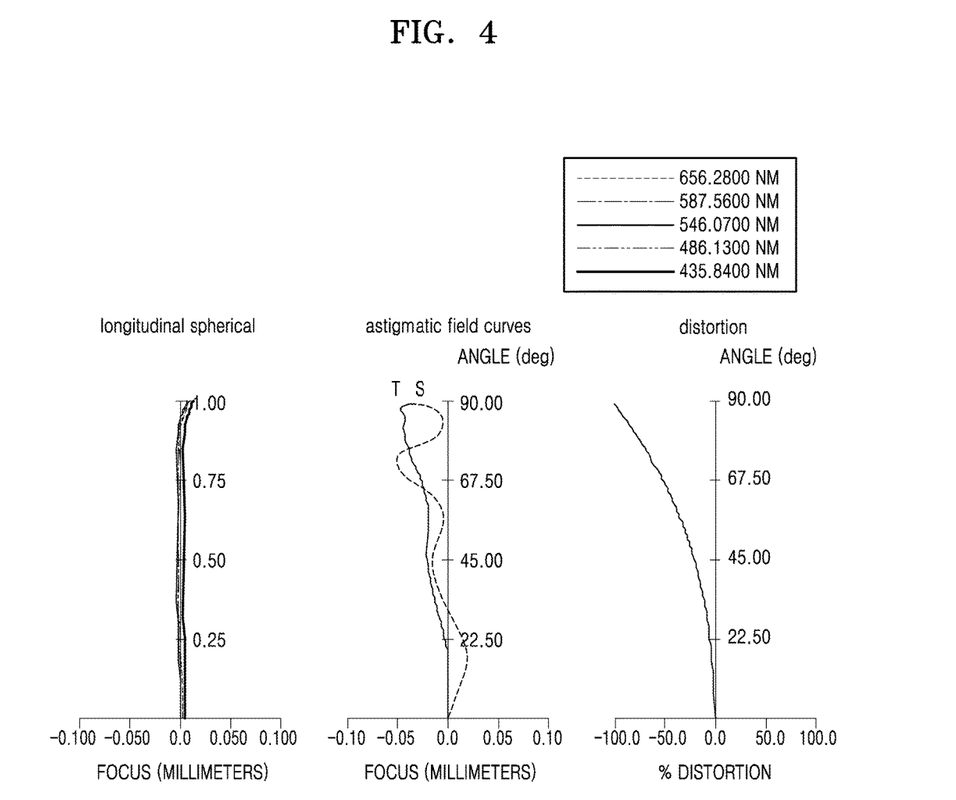
FIG. 4 illustrates aberration diagrams of the super-wide angle lens illustrated in FIG. 3 according to an embodiment of the present disclosure.

FIG. 4 illustrates aberration diagrams of the super-wide angle lens illustrated in FIG. 3 according to an embodiment of the present disclosure.

Table 8 below shows that the super-wide angle lens according to the first and second embodiments of the present disclosure satisfy Equations 1 through 5.

TABLE 8

| | First embodiment | Second embodiment |
|---|---|---|
| Equation 1 | 13.33 | 12.32 |
| Equation 2 | 0.026 | −0.082 |
| Equation 3 | −1.05 | −1.00 |
| Equation 4 | 0.18 | 0.20 |
| Equation 5 | 2.25 | 2.33 |

The super-wide angle lens according to the various embodiments of the present disclosure may be used in photographing apparatuses including an image sensor. The super-wide angle lens according to the various embodiments of the present disclosure may be used in various photographing apparatuses such as digital still cameras, interchangeable lens cameras, video cameras, mobile phone cameras, cameras for compact mobile devices, cameras for automobiles, or the like.

Figure 5:
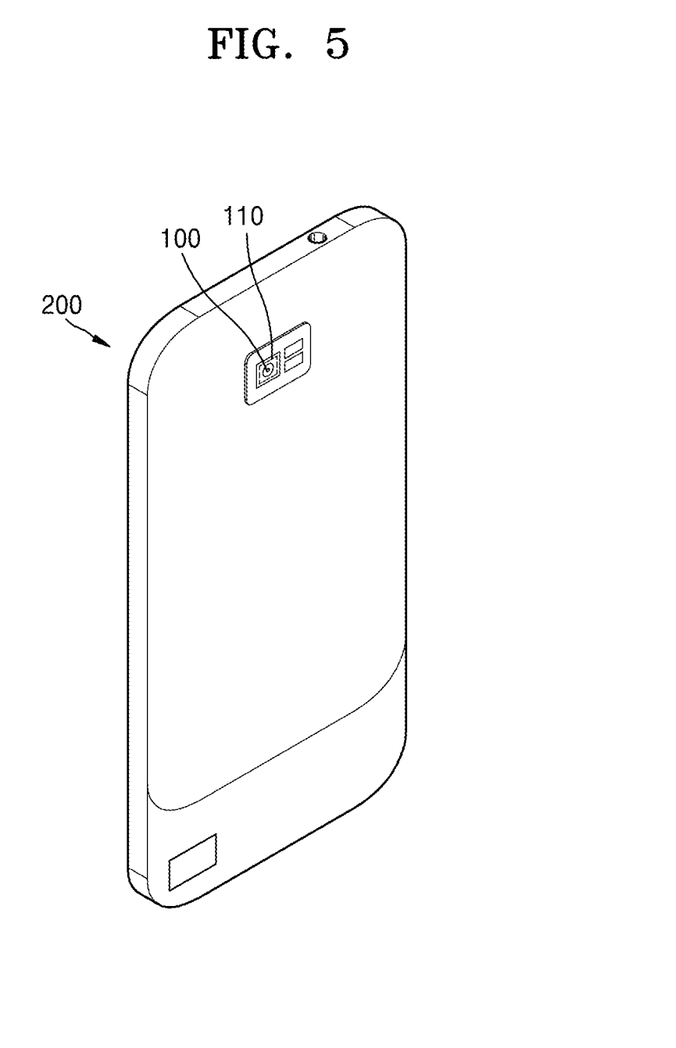
FIG. 5 is a perspective view of a photographing apparatus according to an embodiment of the present disclosure.

FIG. 5 is a perspective view of a photographing apparatus according to an embodiment of the present disclosure.

Referring to FIG. 5, a photographing apparatus 200 including a super-wide angle lens is illustrated. For example, the photographing apparatus 200 may be implemented as a mobile phone. The photographing apparatus 200 may include the super-wide angle lens 100 and an image sensor 110 configured to receive and convert images formed by the super-wide angle lens 100 into electrical image signals. The super-wide angle lens 100 may be any of the super-wide angle lenses described above with reference to FIGS. 1 to 4. If the super-wide angle lens 100 according to various embodiments of the present disclosure is used in photographing apparatuses such as compact digital cameras, cameras of mobile devices, or cameras for automobiles, the photographing apparatuses may capture images with a wide angle view and exhibit high photographing performance.

It should be understood that various embodiments of the present disclosure described herein should be considered in a descriptive sense only and not for purposes of limitation. Descriptions of features or aspects within each embodiment should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A super-wide angle lens comprising:
   a first lens having a negative refractive power;
   a second lens having a positive refractive power and comprising a biconvex lens;
   a third lens which has a convex meniscus shape toward an image plane;
   a fourth lens;
   a fifth lens;
   a sixth lens which is disposed closest to an image side of the super-wide angle lens and has an object side surface which has a convex shape around an optical axis and a concave shape away from the optical axis and an image side surface which has a concave shape around the optical axis and a convex shape away from the optical axis; and
   an aperture stop between the second lens and the third lens,
   wherein the first lens is disposed at a most object side of the super-wide angle lens and the second lens is disposed at an image side of the first lens without another intervening lens,
   wherein a half view angle of the super-wide angle lens is 80 degrees or greater and the super-wide angle lens satisfies 8<ω/TL<18, and
   wherein ω denotes a half view angle and TL denotes a distance from an object side surface of the first lens to the image plane.

2. The super-wide angle lens of claim 1,
   wherein the super-wide angle lens satisfies 0.15>f/f12>−0.15, and wherein f12 denotes a combined focal length of the first lens and the second lens and f denotes an entire focal length of the super-wide angle lens.

3. The super-wide angle lens of claim 1,
wherein the super-wide angle lens satisfies $-0.75 > (R2+R1)/(R2-R1) > -1.50$, and
wherein R1 denotes a radius of curvature of the object side surface of the first lens and R2 denotes a radius of curvature of an image side surface of the first lens.

4. The super-wide angle lens of claim 1,
wherein the super-wide angle lens satisfies $-0.25 < fB/TL < 0.25$, and
wherein fB denotes a distance from an image side surface of the lens to the image plane and TL denotes a distance from the object side surface of the first lens to the image plane.

5. The super-wide angle lens of claim 1, wherein, when the super-wide angle lens is used in a focusing operation, all lenses included in the super-wide angle lens are moved to perform the focusing operation or at least some of the lenses except the first lens are moved to perform the focusing operation.

6. The super-wide angle lens of claim 1, wherein the first lens comprises glass.

7. The super-wide angle lens of claim 6,
wherein the super-wide angle lens satisfies $1 < (TL/Y) < 4$, and
wherein TL denotes a distance from the object side surface of the first lens to the image plane and Y denotes an effective image height.

8. A super-wide angle lens consisting of:
a first lens having a negative refractive power;
a second lens having a positive refractive power and comprising a biconvex lens;
a third lens having a positive refractive power;
a fourth lens having a positive refractive power;
a fifth lens having a negative refractive power; and
a sixth lens having a positive or negative refractive power,
wherein the super-wide angle lens has a half view angle of 80 degrees or greater,
wherein the lenses are disposed in a sequential order from an object side to an image side, and
wherein the sixth lens has an object side surface which has a convex shape around an optical axis and a concave shape away from the optical axis and an image side surface which has a concave shape around the optical axis and a convex shape away from the optical axis.

9. The super-wide angle lens of claim 8, further comprising an aperture stop between the second lens and the third lens.

10. The super-wide angle lens of claim 8,
wherein the super-wide angle lens satisfies $8 < \omega/TL < 18$, and
wherein $\omega$ denotes a half view angle and TL denotes a distance from an object side surface of the first lens to an image plane.

11. The super-wide angle lens of claim 8,
wherein the super-wide angle lens satisfies $0.15 > f/f12 > -0.15$, and
wherein f12 denotes a combined focal length of the first lens and the second lens and f denotes an entire focal length of the super-wide angle lens.

12. The super-wide angle lens of claim 8,
wherein the super-wide angle lens satisfies $-0.75 > (R2+R1)/(R2-R1) > -1.50$, and
wherein R1 denotes a radius of curvature of an object side surface of the first lens and R2 denotes a radius of curvature of an image side surface of the first lens.

13. The super-wide angle lens of claim 8,
wherein the super-wide angle lens satisfies $-0.25 < fB/TL < 0.25$, and
wherein fB denotes a distance from an image side surface of a lens that is a closest lens to the image side to an image plane and TL denotes a distance from an object side surface of the first lens to the image plane.

14. The super-wide angle lens of claim 8, wherein, when performing a focusing operation, the first to sixth lenses are moved to perform the focusing operation or at least some of the second to sixth lenses are moved to perform the focusing operation.

15. The super-wide angle lens of claim 8, wherein the first lens comprises glass.

16. The super-wide angle lens of claim 15,
wherein the super-wide angle lens satisfies $1 < (TL/Y) < 4$, and
wherein TL denotes a distance from an object side surface of the first lens to an image plane and Y denotes an effective image height.

17. The super-wide angle lens of claim 8, wherein the sixth lens has at least one inflection point on at least one of the object side surface and the image side surface.

18. The super-wide angle lens of claim 8, wherein an object side surface of the third lens has a convex meniscus shape facing an image side.

19. A photographing apparatus comprising:
a super-wide angle lens; and
an image sensor configured to receive an image formed by using the super-wide angle lens,
wherein the super-wide angle lens comprises a first lens having a negative refractive power, a second lens having a positive refractive power, a stop, a third lens which has a convex meniscus shape toward the image sensor, a fourth lens, a fifth lens, and a sixth lens which is disposed closest to an image side of the super-wide angle lens,
wherein the first lens is disposed at a most object side of the super-wide angle lens and the second lens is disposed at an image side of the first lens without another intervening lens and comprises a biconvex lens,
wherein, the sixth lens has an object side surface which has a convex shape around an optical axis and a concave shape away from the optical axis and an image side surface which has a concave shape around the optical axis and a convex shape away from the optical axis,
wherein a half view angle of the super-wide angle lens is 80 degree or greater and the super-wide angle lens satisfies $8 < \omega/TL < 18$, and
wherein $\omega$ denotes a half view angle and TL denotes a distance from an object side surface of the first lens to the image sensor.

* * * * *